(12) United States Patent
Han et al.

(10) Patent No.: US 12,197,803 B2
(45) Date of Patent: Jan. 14, 2025

(54) DISPLAY APPARATUS AND CONTROLLING METHOD THEREOF

(71) Applicant: SAMSUNG ELECTRONICS CO., LTD., Suwon-si (KR)

(72) Inventors: Changmin Han, Suwon-si (KR); Gwanhyung Kim, Suwon-si (KR); Hyeonggwon Kim, Suwon-si (KR); Minjae Shin, Suwon-si (KR); Huijun Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/384,277

(22) Filed: Oct. 26, 2023

(65) Prior Publication Data
US 2024/0143260 A1 May 2, 2024

Related U.S. Application Data

(63) Continuation of application No. PCT/KR2023/013139, filed on Sep. 4, 2023.

(30) Foreign Application Priority Data

Oct. 27, 2022 (KR) .......................... 10-2022-0140601

(51) Int. Cl.
*G06F 3/14* (2006.01)
*G06F 3/023* (2006.01)
(Continued)

(52) U.S. Cl.
CPC ................ *G06F 3/14* (2013.01); *G06F 3/023* (2013.01); *G06F 3/03543* (2013.01);
(Continued)

(58) Field of Classification Search
CPC ........ G06F 3/038; G06F 3/04812; G06F 3/16; G06F 2203/0382; G06F 2203/04803
See application file for complete search history.

(56) References Cited

U.S. PATENT DOCUMENTS

| | | | |
|---|---|---|---|
| 9,008,190 B2 | 4/2015 | Lee et al. | |
| 9,237,296 B2 | 1/2016 | Jung et al. | |
| 9,996,130 B2 | 6/2018 | Rhee | |
| 2006/0069764 A1 | 3/2006 | Azuma et al. | |

(Continued)

FOREIGN PATENT DOCUMENTS

| | | |
|---|---|---|
| CN | 102289423 B | 7/2015 |
| CN | 103365808 B | 8/2016 |

(Continued)

OTHER PUBLICATIONS

International Search Report (PCT/ISA/210) issued Dec. 4, 2023 by the International Searching Authority in International Patent Application No. PCT/KR2023/013139.
(Continued)

*Primary Examiner* — Nelson M Rosario
(74) *Attorney, Agent, or Firm* — Sughrue Mion, PLLC

(57) ABSTRACT

A display apparatus includes an input/output interface connected to an external device and an input device, a memory, a first processor connected to the memory, and a second processor configured to be recognized as a universal serial bus (USB) device by the external device. The first processor generates a first image related to a function of the display apparatus, and a second image based on image data obtained from the external device, and controls the display to display the first image and the second image together. The first processor obtains an input signal from the input device, and based on a cursor corresponding to the input signal being located on the second image, provides the input signal to the second processor, and the second processor provides the input signal to the external device.

20 Claims, 12 Drawing Sheets

(51) Int. Cl.
*G06F 3/0354* (2013.01)
*G06F 3/041* (2006.01)
*G06F 13/10* (2006.01)

(52) U.S. Cl.
CPC .......... *G06F 3/0416* (2013.01); *G06F 13/105* (2013.01); *G06F 2213/0042* (2013.01)

(56) References Cited

U.S. PATENT DOCUMENTS

| | | | |
|---|---|---|---|
| 2010/0194998 | A1 | 8/2010 | Lee et al. |
| 2010/0306800 | A1 | 12/2010 | Jung et al. |
| 2014/0067916 | A1 | 3/2014 | Park et al. |
| 2015/0288912 | A1* | 10/2015 | Chun ................. H04N 21/4882 348/552 |
| 2016/0127764 | A1 | 5/2016 | Jung et al. |
| 2017/0262143 | A1* | 9/2017 | Kim ....................... G06F 3/0482 |
| 2020/0026479 | A1* | 1/2020 | Chen ..................... G06F 3/0482 |

FOREIGN PATENT DOCUMENTS

| | | |
|---|---|---|
| CN | 110989952 A | 4/2020 |
| KR | 10-2008-0008001 A | 1/2008 |
| KR | 10-0828624 B1 | 5/2008 |
| KR | 10-2013-0033671 A | 4/2013 |
| KR | 10-2014-0029049 A | 3/2014 |
| KR | 10-1570098 B1 | 11/2015 |
| KR | 10-1847034 B1 | 4/2018 |
| KR | 10-2018-0062898 A | 6/2018 |
| KR | 10-2136068 B1 | 7/2020 |

OTHER PUBLICATIONS

Written Opinion (PCT/ISA/237) issued Dec. 4, 2023 by the International Searching Authority in International Patent Application No. PCT/KR2023/013139.

* cited by examiner

DISPLAY APPARATUS AND CONTROLLING METHOD THEREOF

CROSS-REFERENCE TO RELATED APPLICATION(S)

This application is a bypass continuation of International Application No. PCT/KR2023/013139, filed on Sep. 4, 2023, which is based on and claims priority to Korean Patent Application No. 10-2022-0140601, filed on Oct. 27, 2022, in the Korean Intellectual Property Office, the disclosures of which are incorporated by reference herein in their entireties.

BACKGROUND

1. Field

The disclosure relates to a display apparatus and a controlling method thereof, and more particularly, to a display apparatus for processing an input signal of an input device or transmitting the input signal to an external device, and a controlling method thereof.

2. Description of Related Art

Display apparatuses may implement various functions. There may be an inconvenience in an input method using an existing remote controller. Accordingly, in order to use an input device such as a keyboard or a mouse, the input device connected to the computer must be separated from the computer first. Then, the separated input device is connected to the display and an input signal output from the input device is used in the display apparatus.

To overcome this inconvenience, a switch may be used. Through connection of a switch, a display apparatus and an external device (e.g., PC) may share the same input device (e.g., keyboard or mouse).

SUMMARY

According to an aspect of the disclosure, a display apparatus includes an input/output interface connected to an external device and an input device; a display; a memory configured to store at least one instruction; a first processor connected to the memory and configured to control the display apparatus; and a second processor configured to be recognized as a universal serial bus (USB) device by the external device, wherein the first processor is configured to, by executing the at least one instruction: generate a first image related to a function of the display apparatus; generate a second image based on image data obtained from the external device; control the display to display the first image and the second image together; obtain an input signal from the input device; and based on a cursor corresponding to the input signal being located on the second image, provide the input signal to the second processor, wherein the second processor is configured to, based on obtaining the input signal, provide the input signal to the external device.

The first processor may be further configured to, based on the cursor corresponding to the input signal being located on the first image, process the input signal.

The external device may be a USB host device, and the input device may be a USB input device.

The second processor may be further configured to, based on connecting with the external device, be a logic integrated circuit recognized as the USB device.

The second processor may be further configured to, based on obtaining the input signal, convert the input signal to USB data, and provide the input signal converted to the USB data to the external device.

The input device may include a mouse, and wherein the first processor may be further configured to: based on the cursor being located on the first image and an input signal of the mouse being obtained, process the input signal of the mouse, and based on the cursor being located on the second image and the input signal of the mouse being obtained, provide the input signal of the mouse to the second processor.

The input device further may include a keyboard, and wherein the first processor may be further configured to: based on the cursor being located on the first image and the input signal of the keyboard being obtained, process the input signal of the keyboard, and based on the cursor being located on the second image and the input signal of the keyboard being obtained, provide the input signal of the keyboard to the second processor.

The first processor may be further configured to: obtain a user touch input signal, based on the user touch input signal being an input of touching an area of the first image, process the user touch input signal, and based on the user touch input signal being an input of touching an area of the second image, provide the user touch input signal to the second processor.

The first processor may be further configured to control the display to display the first image and the second image in a picture in picture (PIP) manner.

The input device may be a mouse or a keyboard.

The first processor may be further configured to: generate a third image based on second image data obtained from a second external device, generate a fourth image based on third image data obtained from a third external device, and control the display to display the first image, the second image, the third image, and the fourth image together, based on the cursor corresponding to the input signal being located on the third image, provide the input signal to the second processor and provide the input signal to the second external device, and based on the cursor corresponding to the input signal being located on the fourth image, provide the input signal to the second processor and provide the input signal to the third external device.

According to an aspect of the disclosure, a method of controlling a display apparatus includes, by a first processor, generating a first image related to a function of the display apparatus, generating a second image based on image data obtained from an external device, and displaying the first image and the second image together; obtaining, by the first processor, an input signal from an input device; based on a cursor corresponding to the input signal being located on the second image, providing, by the first processor, the input signal to a second processor; and based on obtaining the input signal, providing, by the second processor, the input signal to the external device.

The method may include, based on the cursor corresponding to the input signal being located on the first image, processing the input signal.

The external device may be a universal serial bus (USB) host device, and the input device may be a USB input device.

The second processor, based on connecting with the external device, may be a logic integrated circuit recognized as a universal serial bus (USB) device.

According to an aspect of the disclosure, an electronic apparatus includes a memory configured to store at least one instruction; at least one processor including a first processor and a second processor; wherein the first processor is configured to, by executing the at least one instruction: generate a first image related to a function of the electronic apparatus; generate a second image based on image data obtained from an external device; control a display to display the first image and the second image together; obtain an input signal from an input device; and based on a cursor corresponding to the input signal being located on the second image, provide the input signal to the second processor, wherein the second processor is configured to: be recognized as a universal serial bus (USB) device by the external device; and based on obtaining the input signal, provide the input signal to the external device.

The first processor may be further configured to, based on the cursor corresponding to the input signal being located on the first image, process the input signal.

The second processor may be further configured to, based on connecting with the external device, be a logic integrated circuit recognized as the USB device.

The second processor may be further configured to, based on obtaining the input signal, convert the input signal to USB data, and provide the input signal converted to the USB data to the external device to the USB data to the external device.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
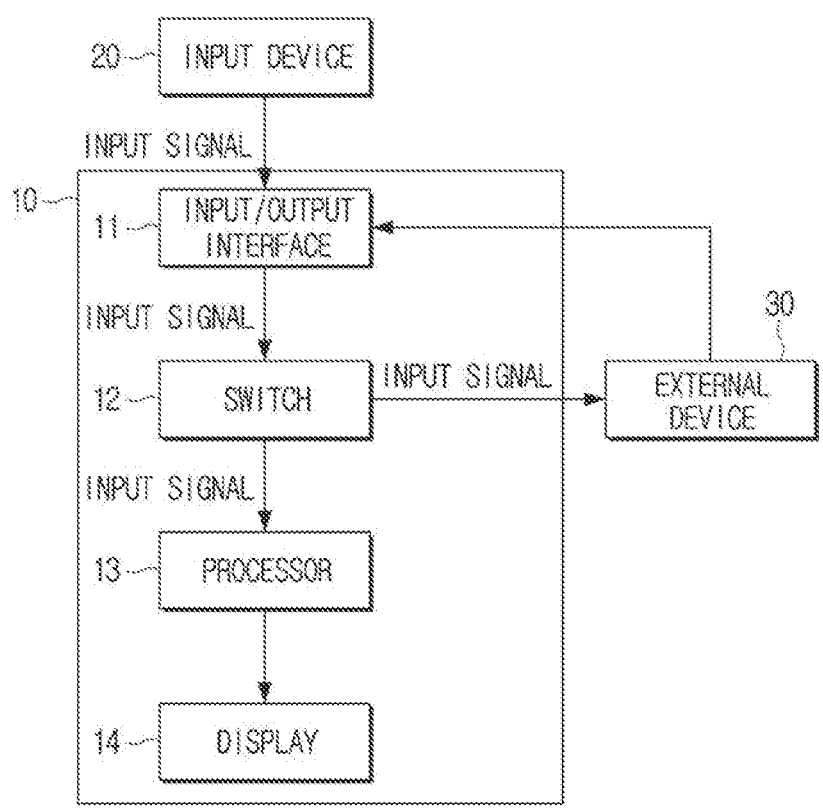
FIG. 1 is a diagram illustrating a related-art display apparatus.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In the disclosure, a detailed description of known functions or configurations incorporated herein may be omitted if it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the disclosure. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that if an element (e.g., a first element) is "operatively or communicatively coupled with/to" another element (e.g., a second element), any such element may be directly connected to the other element or may be connected via another element (e.g., a third element).

On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense.

Under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and regions in the drawings are schematically drawn. Accordingly, the technical spirit of the present disclosure is not limited by the relative size or spacing depicted in the accompanying drawings.

Hereinafter, with reference to the attached drawings, embodiments will be described in detail so that those skilled in the art to which the disclosure belongs to can easily make and use the embodiments.

FIG. 1 is a diagram illustrating a related-art display apparatus.

Referring to FIG. 1, a related-art display apparatus 10 may include an input/output interface 11, a switch 12, a processor 13, and a display 14.

At this time, the input/output interface 11 may receive an input signal from an input device. In addition, the switch 12 may transmit an input signal obtained through the input/output interface 11 to the external device 30 or may transmit the input signal to the processor 13.

The processor 13 may control the switch 12 and may transmit the input signal received from the input device 20 to the external device 30, or receive and process an input signal.

In this example, based on a screen displayed on the display 14, the processor 13 may transmit an input signal received from the input device 20 to the external device 30, or may identify whether to receive and process the input signal.

Specifically, the processor 13 may control the display 14 to display a screen corresponding to the display apparatus 10. The processor 13 may control the switch 12 to receive an input signal, and process the input signal to control a screen corresponding to the display apparatus 10.

The processor 13 may control the display 14 to display a screen corresponding to the external device 30. At this time, the processor 13 may control the switch 12 to transmit the input signal to the external device 30.

However, there is a problem in that the above method may not be applied to a case where a screen of the display 14 is divided and a screen corresponding to the display apparatus 10 is displayed on a first area of the display 14, and a screen corresponding to the external device 30 is displayed in the second area of the display 14.

Whenever the switch 12 is controlled so that an input signal of the input device 20 is transmitted to the external device 30, a connection process between the input device 20 and the external device 30 is performed, and there may be a problem that connection process fails.

To solve the above-described problem, a display apparatus according to the disclosure may process an input signal acquired from an input device without a separate switch or transmit the input signal to an external device.

Figure 2:
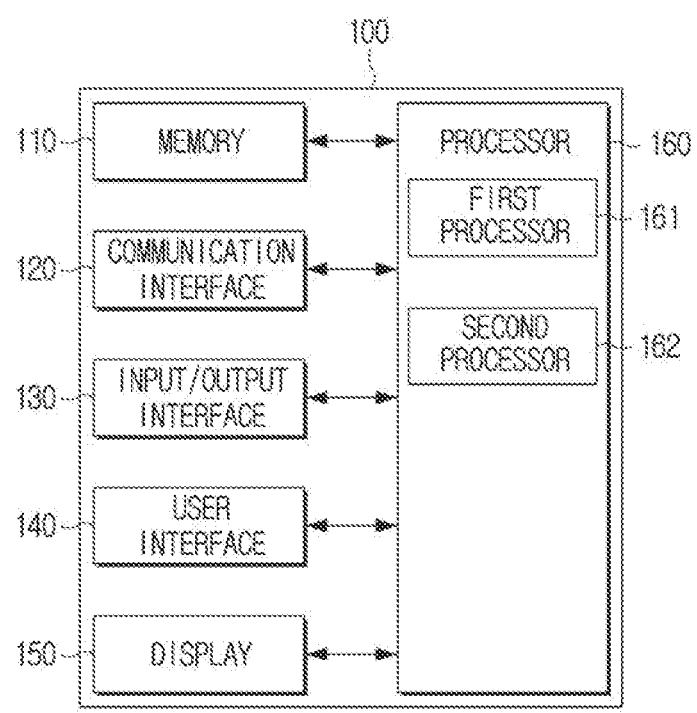
FIG. 2 is a block diagram illustrating a feature of a display apparatus according to one or more embodiments of the disclosure.

FIG. 2 is a block diagram illustrating a feature of a display apparatus according to one or more embodiments of the disclosure.

A display apparatus 100 may include a memory 110, a communication interface 120, an input/output interface 130, a user interface 140, a display 150, and a processor 160. In the display apparatus 100, some of the above elements may be omitted or may further include other elements.

The display apparatus 100 may be implemented as a monitor, but this is merely exemplary, and the display apparatus 100 may be implemented in various forms such as a TV, a smart TV, a set-top box, a smartphone, a mobile phone, a personal digital assistant (PDA), a laptop, a media player, an electronic book terminal, a digital broadcast terminal, a navigation device, a kiosk, an MP3 player, a wearable device, a home appliance, and other mobile or non-mobile computing devices. In addition, the display apparatus 100 may be connected to another external device to perform one or more functions.

The memory 110 may store at least one instruction regarding the display apparatus 100. The memory 110 may store an operating system (O/S) for driving the display apparatus 100. The memory 110 may store various software programs or applications for operating the display apparatus 100 according to various embodiments. The memory 110 may include a semiconductor memory such as a flash memory, a magnetic storage medium such as a hard disk, or the like.

Specifically, the memory 110 may store various software modules for operating the display apparatus 100 according to various embodiments of the disclosure, and the processor 160 may execute various software modules stored in the memory 110 to control the operation of the display apparatus 100. That is, the memory 110 is accessed by the processor 160 and reading/writing/modifying/deleting/updating of data by the processor 160 may be performed.

In the disclosure, the term memory may include the memory 110, read-only memory (ROM) in the processor 160, RAM, or a memory card (for example, a micro secure digital (SD) card, and a memory stick) mounted to the display apparatus 100.

The communication interface 120 includes circuitry and is configured to communicate with an external device and a server. The communication interface 120 may communicate with an external device or a server based on a wired or wireless communication method. The communication interface 120 may include a Bluetooth module, a Wi-Fi module, an infrared (IR) module, a Local Area Network (LAN) module, an Ethernet module, and the like. Each communication module may be implemented in at least one hardware chip. The wireless communication module may include at least one communication chip performing communication according to various communication standards, such as Zigbee, universal serial bus (USB), mobile industry processor interface camera serial interface (MIPI CSI), third generation (3G), 3rd generation partnership project (3GPP), long term evolution (LTE), LTE advanced (LTE-A), 4th generation (4G), 5th generation (5G), or the like, in addition to the communication modes described above. These are merely examples, and the communication interface 120 may use at least one communication module among various communication modules.

The input/output interface 130 may include various input/output circuitry, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input/output interface 130 may input and/or output at least one of an input signal, an audio, and a video signal from an external electronic device (e.g., the input device 200 or the external device 300). According to an embodiment of the disclosure, the input/output interface 130 may include a port for inputting and outputting only an input signal, a port for inputting and outputting only an audio signal, and a port for inputting and outputting only a video signal as a separate port or one port for inputting and outputting both the input signal, the audio signal, and the video signal.

The user interface 140 is configured to receive a user input to control the display apparatus 100. The user interface 140 may be implemented with a device like a button, a touch pad, a mouse, a keyboard, or a touch screen capable of performing a display function and operation input function. The button may be various types of buttons such as a mechanical button, a touch pad, a wheel, or the like, formed in an arbitrary area such as at least one of a front portion, a side portion, a back portion, or the like, of the outer surface of the main body of the display apparatus 100. The display apparatus 100 may obtain various user inputs through the user interface 140.

The display 150 may be implemented as a display including a self-emitting element or a display including a non-self-limiting element and a backlight. For example, the display 150 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 150, a backlight unit, a driving circuit which may be implemented as an a-si TFT, low temperature poly silicon (LTPS) TFT, organic TFT (OTFT), or the like, may be included as well.

The processor 160 may control overall operations and functions of the display apparatus 100. To be specific, the processor 160 may be connected to the configuration of the display apparatus 100 including the memory 110, and by executing at least one instruction stored in the memory 110 as described above, the processor 160 may control overall operation of the display apparatus 100.

The processor 160 may be implemented in various ways. For example, the processor 160 may be implemented as at least one of an application specific integrated circuit (ASIC), a logic integrated circuit, an embedded processor, a microprocessor, a hardware control logic, a hardware finite state machine (FSM), a digital signal processor (DSP), or the like. Further, processor 160 may include at least one of a central processing unit (CPU), a graphic processing unit (GPU), a main processing unit (MPU), or the like.

The operation of the processor 160 to implement various embodiments of the disclosure may be embodied through a plurality of modules.

Specifically, data for a plurality of modules according to the disclosure may be stored in the memory 110, and the processor 160 may access the memory 110 to load data for the plurality of modules into a memory or a buffer inside the processor 160, and then use the plurality of modules to implement various embodiments according to the disclosure.

However, at least one of the plurality of modules according to the disclosure may be implemented as hardware and included in the processor 160 in the form of a system on chip.

At least one of a plurality of modules according to the disclosure may be implemented as a separate external device, and the display apparatus 100 and each module may perform communication and may perform an operation according to the disclosure.

The processor 160 according to the disclosure may include a first processor 161 and a second processor 162.

The first processor 161 may process an input signal obtained from the input device 200 or transmit an input signal obtained from the input device 200 to the second processor 162.

When the second processor 162 is connected to the external device 300, the second processor 162 may be a logic integrated circuit programmed to be recognized as a USB device. Accordingly, in order to transmit an input signal of the input device 200 to the external device 300, it is possible to solve a problem of performing a connection between the input device 200 and the external device 300. The external device 300 may be a USB host device.

Hereinbelow, with reference to the attached drawings, an operation of the processor 160 according to the disclosure will be described in detail.

Figure 3:
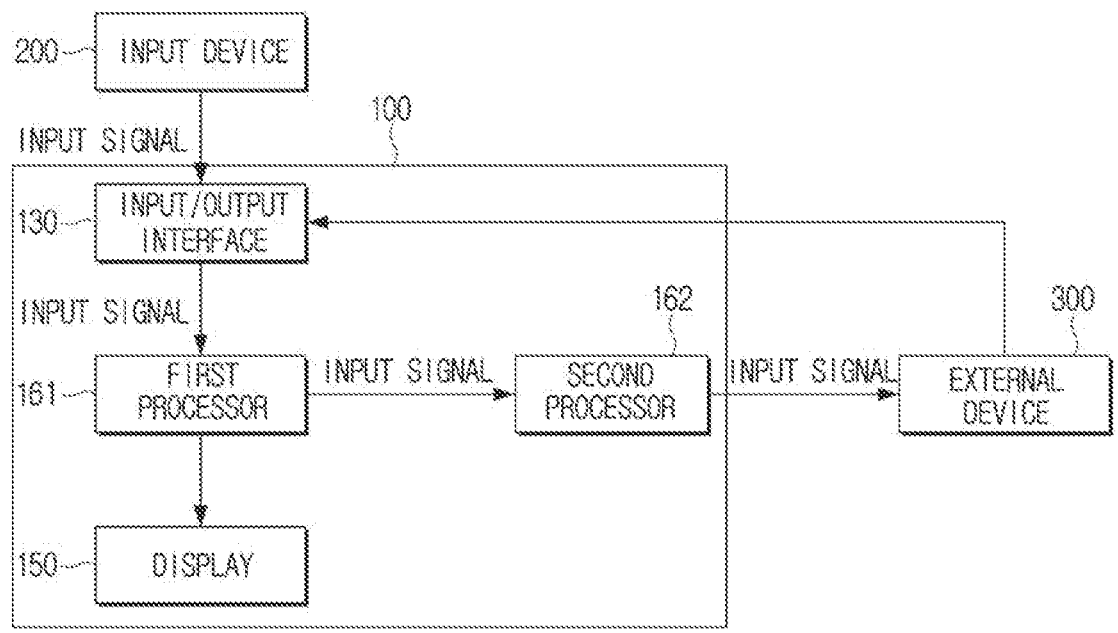
FIG. 3 is a diagram illustrating an operation of a display apparatus according to one or more embodiments of the disclosure.

FIG. 3 is a diagram illustrating an operation of the display apparatus 100 according to one or more embodiments of the disclosure.

The first processor 161 may display an image corresponding to the external device 300 in a first area of the display 150, and display an image corresponding to the display apparatus 100 in a second area of the display 150.

Specifically, the first processor 161 may display an image corresponding to the external device 300 in a first area of the display 150 by using image data obtained from the external device 300 through the input/output interface 130.

The first processor 161 may display an image controlled by the first processor 161 in a second area of the display 150. Specifically, the first processor 161 may access data stored in the memory 110 to control the display 150 to display various images in a second area of the display 150.

Specifically, the first processor 161 may generate a first image related to a function of the display apparatus 100. The first processor 161 may generate a second image based on the image data received from the external device 300. The first processor 161 may control the display 150 to display the first image and the second image together.

Figure 4A:
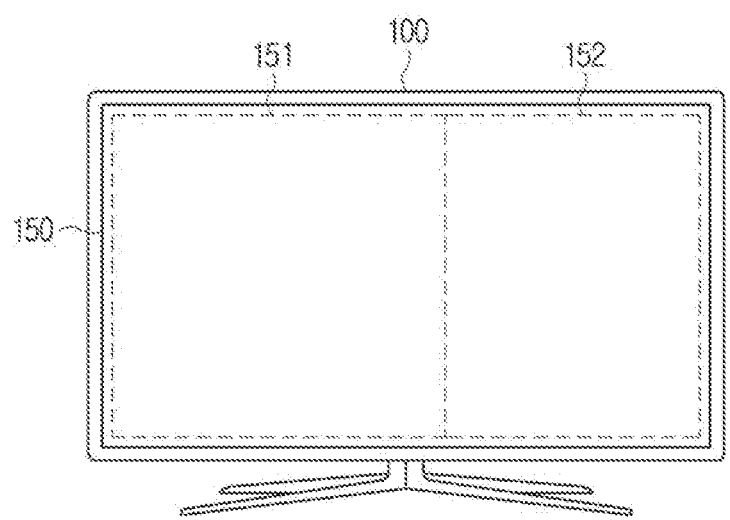
FIGS. 4A and 4B are diagrams illustrating a display screen according to one or more embodiments of the disclosure.
Figure 4B:
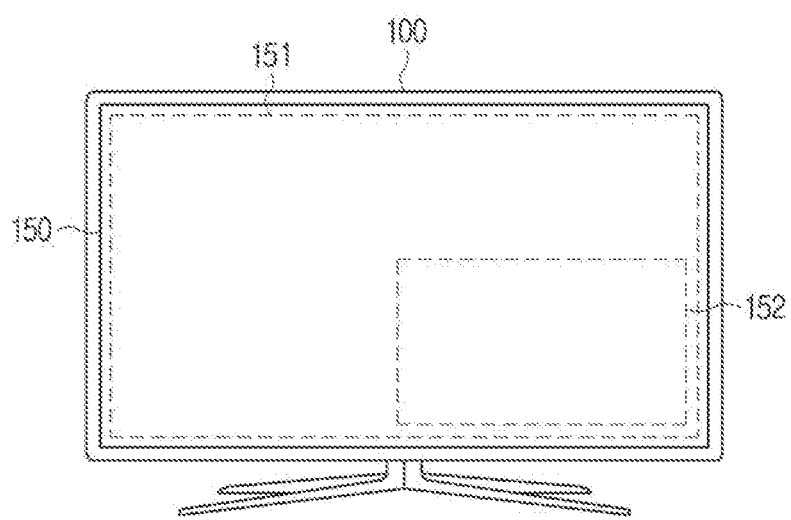

For example, as illustrated in FIG. 4A, the first processor 161 may display a first image on a first area 151 of the display 150 and display a second image on a second area 152 of the display 150. The first processor 161 may divide and display the display 150 into a first area 151 and a second area 152, but this is merely an embodiment, and the first processor 161 may display the first area 151 and the second area 152 of the display 150 in a picture-in-picture (PIP) manner, as illustrated in FIG. 4B. That is, the first processor 161 may control the display 150 to display the first image and the second image in a PIP manner.

The first processor 161 may receive an input signal from an input device. The input device may include at least one of a mouse and a keyboard. The input signal may be a signal for a user input obtained by using an input device.

Based on the coordinate value of the received input signal, the first processor 161 may process the input signal or transmit the input signal to the second processor 162. That is, the first processor 161 may allocate or transmit the received input signal to the second processor 162. The input signal obtained from the input device 200 may include information on a coordinate value (for example, an x coordinate value and a y coordinate value).

Specifically, the first processor 161 may identify an image in which a cursor corresponding to an input signal is located, process an input signal based on the identified image, or transmit the input signal to the second processor 162.

Figure 5:
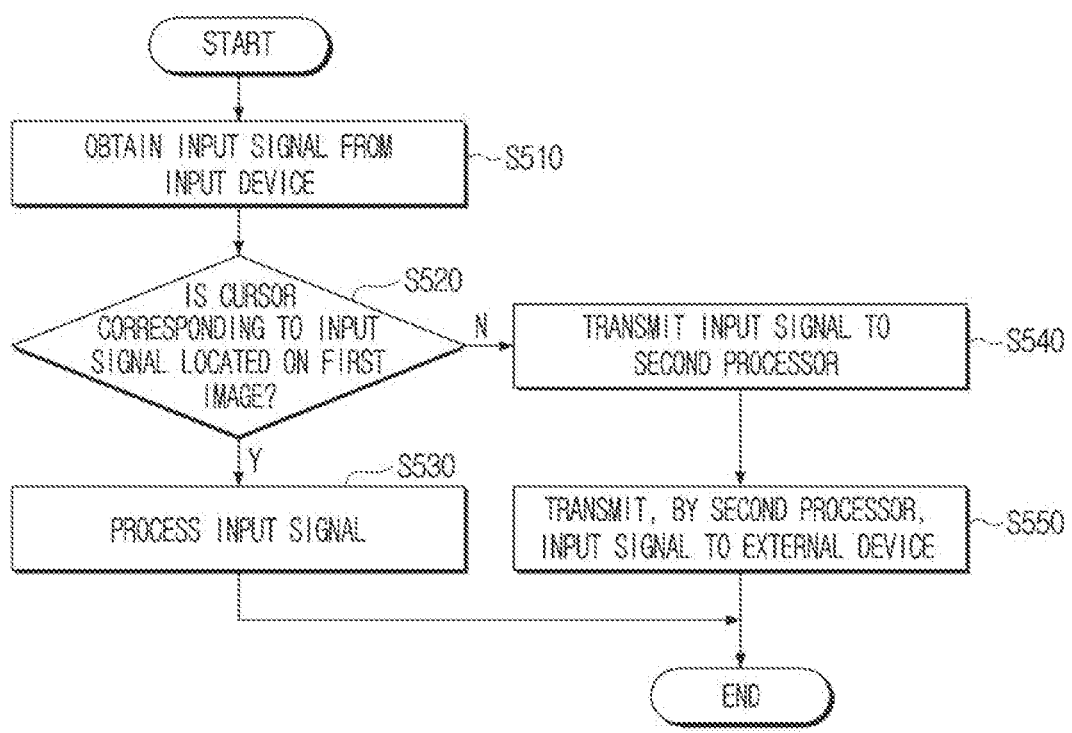
FIG. 5 is a flowchart illustrating an operation of a display apparatus according to one or more embodiments of the disclosure.

Specifically, referring to FIG. 5, the first processor 161 may obtain an input signal from an input device in operation S510, and may identify whether a cursor corresponding to the input signal is located in a first image in operation S520.

At this time, when a cursor of an input signal is located in the first image in operation S510-Y, the first processor 161 may process an input signal in operation S520.

To be specific, the first processor 161 may obtain information about an image reflecting an input signal by processing an input signal. In addition, the first processor 161 may control the display 150 to display an image reflecting an input signal in the first area of the display 150.

Specifically, if a cursor corresponding to an input signal is not located on a first image in operation S510-N, that is, when a cursor corresponding to an input signal is located on a second image, the first processor 161 may transmit an input signal to the second processor 162 in operation S530.

In addition, when an input signal is received, the second processor 162 may transmit an input signal to the external device 300.

The second processor 162 may convert the input signal into USB data and may transmit the converted input signal to the external device 300. At this time, the USB data may mean USB packet data.

Accordingly, the external device 300 may process the received input signal and transmit the image data to which the input signal is reflected to the display apparatus 100.

That is, the first processor 161 may receive image data reflecting the input signal from the external device 300 through the input/output interface 130.

The first processor 161 may generate an image by using image data to which an input signal is reflected and control the display 150 to display the image on a second area of the display 150.

Figure 6A:
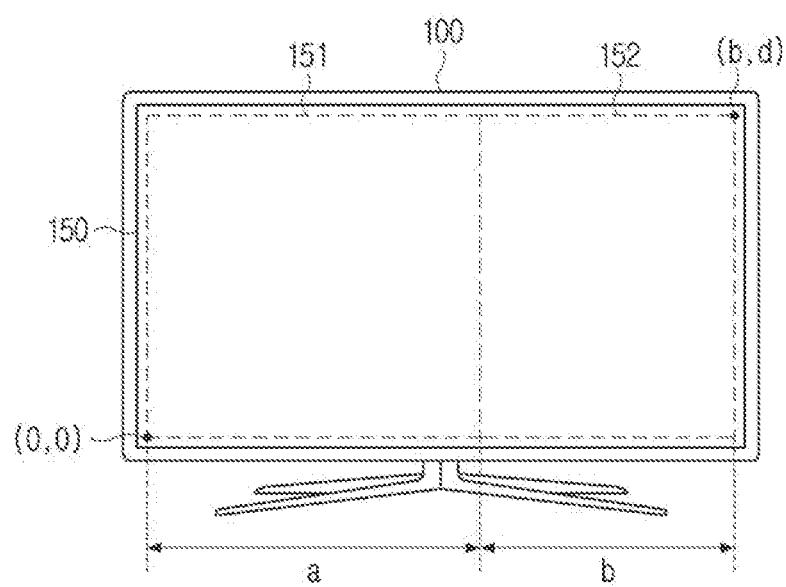
FIGS. 6A, 6B, and 6C are diagrams illustrating an operation of a display apparatus according to one or more embodiments of the disclosure.

For example, referring to FIG. 6A, a first area 151 and a second area 152 of the display 150 may be divided into a:b. At this time, when the x value of the input coordinate of the input signal (that is, the x coordinate value of the cursor corresponding to the input signal) is equal to or less than a, the first processor 161 may process the input signal. When the x value of the input coordinate of the input signal exceeds a, the first processor 161 may transmit the input signal to the second processor 162.

The input device according to the disclosure may include at least one of a mouse or a keyboard.

Figure 6B:
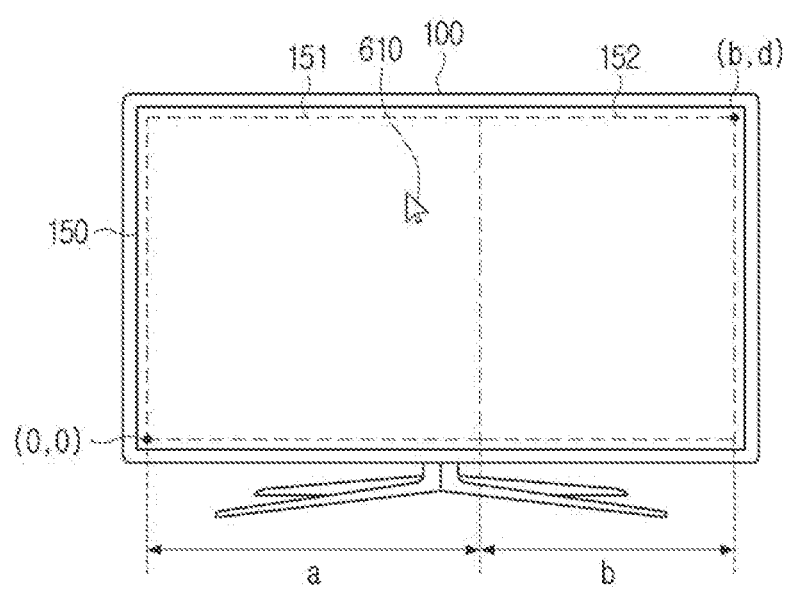

As shown in FIG. 6B, a cursor 610 corresponding to the location of the mouse may be located in the first area 151 (i.e., on the first image). At this time, when the cursor 610 corresponding to the location of the mouse is located in the first area 151 of the display 150 and the input signal of the mouse is received, the first processor 161 may process the input signal of the mouse. That is, the first processor 161 may control the display 150 to display an image in which the input signal of the mouse is reflected in the first area 151.

Figure 6C:
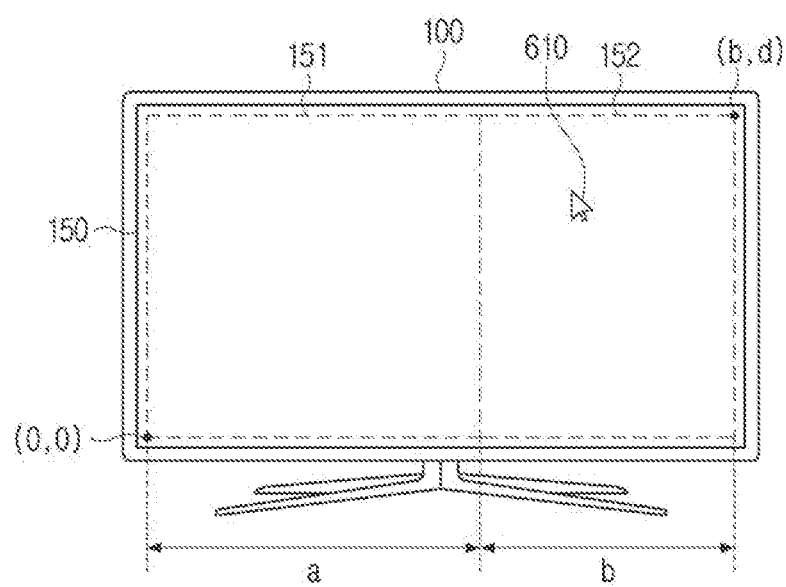

As illustrated in FIG. 6C, when a cursor 610 corresponding to a location of a mouse is located in a second area 152 (that is, on a second image), and an input signal of a mouse is received, the first processor 161 may transmit an input signal of a mouse to the second processor.

In the meantime, based on the coordinate value of the cursor corresponding to the location of the mouse, the first processor 161 may process an input signal acquired from the keyboard or transmit the input signal to the second processor 162.

Specifically, when a cursor 610 corresponding to a location of a mouse is located on a first image and an input signal of a keyboard is received, the first processor 161 may process an input signal of a keyboard.

If the cursor 610 corresponding to the location of the mouse is located on the second image, and when an input signal of the keyboard is received, the first processor 161 may transmit an input signal of the keyboard to the second processor 162.

Figure 7:
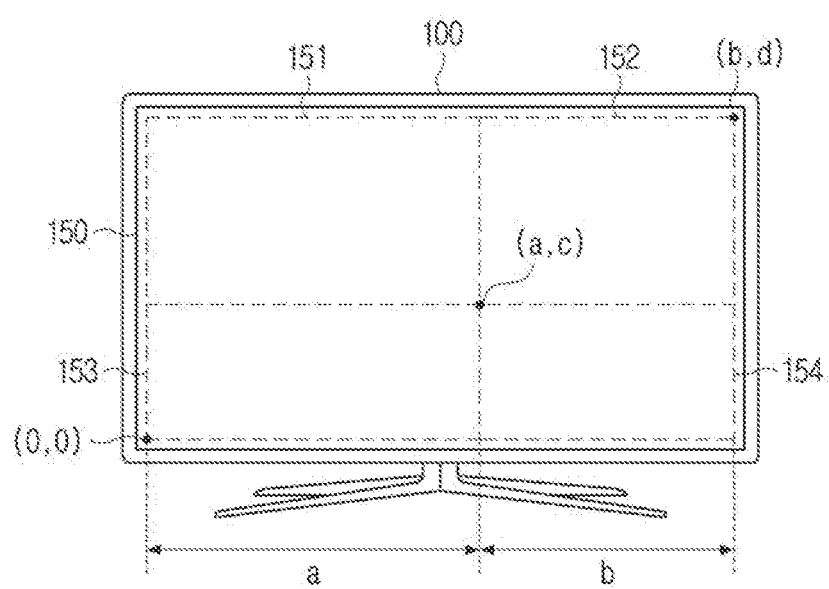
FIG. 7 is a diagram illustrating an operation of a display apparatus according to one or more embodiments of the disclosure.

The display 150 may be divided into the first area 151 and the second area 152, but this is merely an embodiment, and the display 150 may be divided into the first area 151, the second area 152, a third area 153, and a fourth area 154, as shown in FIG. 7.

In the meantime, the first processor 161 may control the display 150 to display a first image corresponding to the display apparatus 100 on the first area 151 of the display 150, display a second image corresponding to the external device 300 on the second area 152 of the display 150, display a third image corresponding to the second external device on the third area 153 of the display 150, and display a fourth image corresponding to the third external device on the fourth area 154 of the display 150 together.

At this time, an image corresponding to the display apparatus 100 may refer to an image related to a function of the display apparatus 100. Each of the second image, the third image, and the fourth image may refer to an image generated based on image data received from each of the external device 300, the second external device, and the third external device through the input/output interface 130.

That is, the processor 160 may control the display 150 to display an image of a device corresponding to each area of the display 150 in each area of the display 150.

At this time, when the input signal is received from the input device 200, the first processor 161 may transmit an input signal to an external device corresponding to the image in which the cursor corresponding to the input signal is located.

Specifically, when a cursor corresponding to an input signal is located on a second image, a third image, or a fourth image, the first processor 161 may transmit an input signal to the second processor 162. The first processor 161 may transmit the location information of the cursor corresponding to the input signal to the second processor 162.

When an input signal and location information of a cursor corresponding to the input signal are received, the second processor 162 may transmit an input signal to an external device corresponding to an image in which a cursor corresponding to the input signal is located.

At this time, the second processor 162 may convert an input signal into USB data, and may transmit an input signal converted into USB data to an external device corresponding to an area including a coordinate value of the input signal.

For example, when a cursor corresponding to an input signal is located on a second image (that is, when an x value of a coordinate value of a cursor corresponding to an input signal exceeds a and a y value exceeds c), the second processor 162 may transmit an input signal to an external device 300 corresponding to the second image.

When the cursor corresponding to the input signal is located on the third image (that is, when the x value of the coordinate value of the cursor corresponding to the input signal is less than or equal to a and the y value is less than or equal to c), the second processor 162 may transmit the input signal to the second external device corresponding to the third image.

When the cursor corresponding to the input signal is located on the fourth image (that is, when the x value of the coordinate value of the cursor corresponding to the input signal is less than or equal to a and the y value is less than or equal to c), the second processor 162 may transmit the input signal to the third external device corresponding to the fourth image.

The input signal according to the disclosure may be a signal obtained from an input device, but this is merely exemplary, and the input signal according to the disclosure may be a user touch input signal. At this time, the display apparatus 100 may process a user touch input signal or transmit a user touch input signal to the external device 300.

Figure 8:
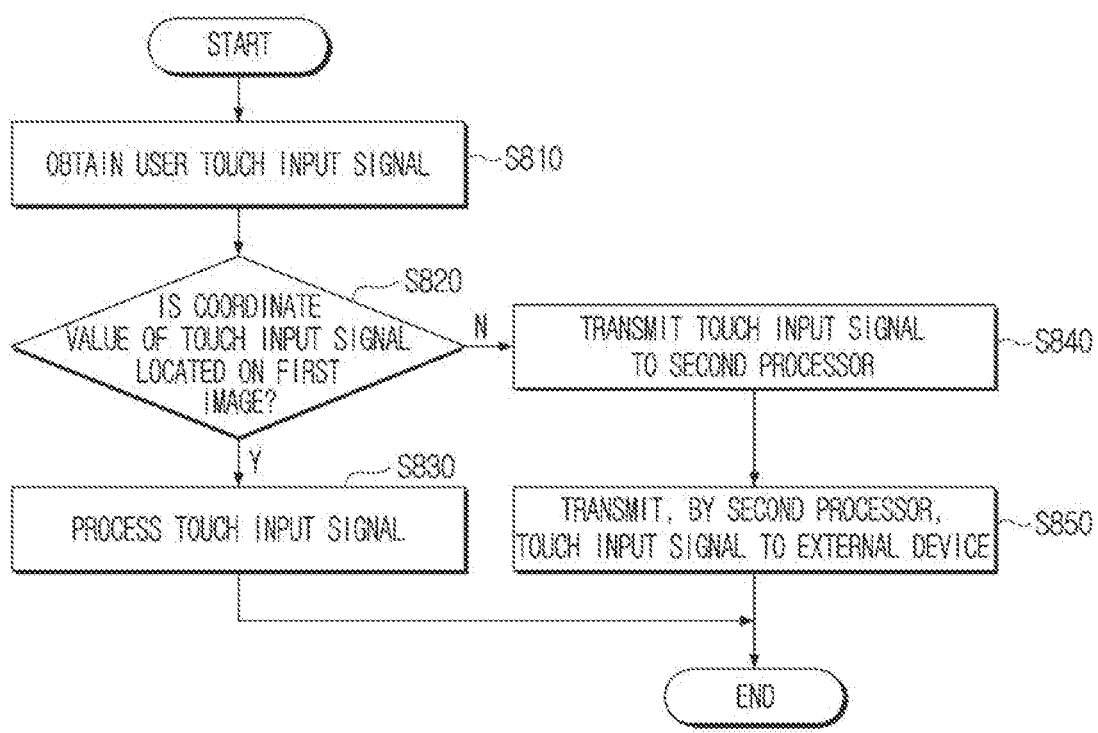
FIG. 8 is a flowchart illustrating an operation of a display apparatus according to one or more embodiments of the disclosure.

Referring to FIG. 8, the first processor 161 may obtain a touch input signal from a user in operation S810. The touch input signal may be an input signal touching a first image or a second image of the display 150.

In addition, the first processor 161 may identify whether a coordinate value of a touch input signal is located in the first image in operation S820.

When a coordinate value of the touch input signal is located in the first image in operation S820-Y, the first processor 161 may process a touch input signal in operation S830.

When the coordinate value of the touch input signal is located on the second image in operation S820-N, the first processor 161 may transmit the touch input signal to the second processor 162 in operation S840.

In operation S850, the second processor 162 may transmit a touch input signal to an external device corresponding to a coordinate value including a touch input. The second processor 162 may convert a touch input signal into USB data, and transmit a touch input signal converted into USB data to an external device corresponding to a coordinate value including a touch input.

Figure 9:
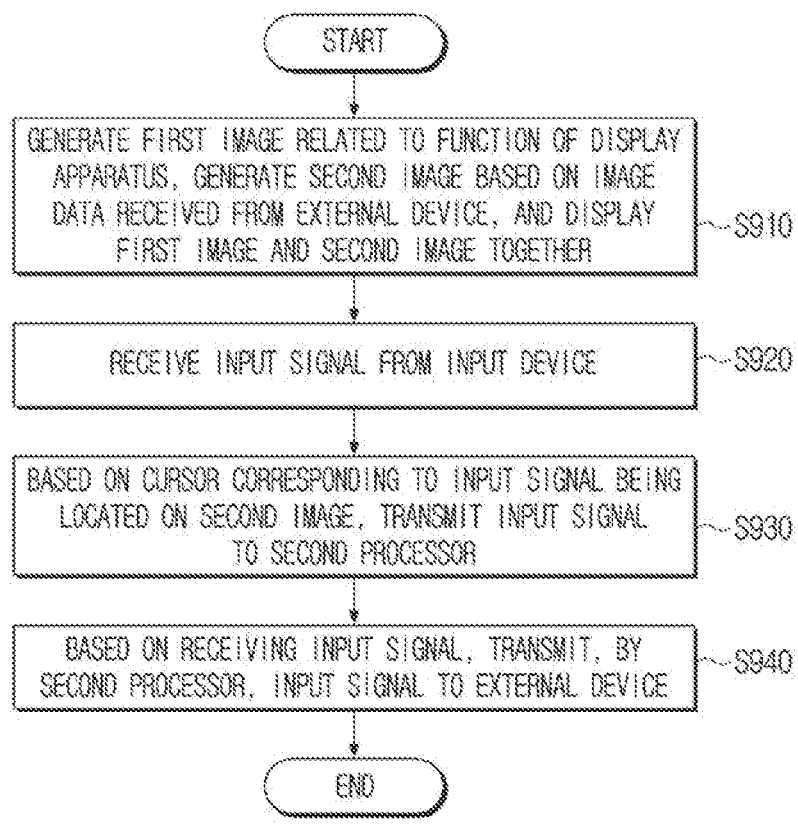
FIG. 9 is a flowchart illustrating a method of controlling a display apparatus according to one or more embodiments of the disclosure.

FIG. 9 is a flowchart illustrating a method of controlling a display apparatus according to one or more embodiments of the disclosure.

The method may include generating a first image related to a function of the display apparatus, generating a second image based on image data received from the external device, and controlling the display to display the first image and the second image together in operation S910.

The external device 300 may be a USB host device, and the input device 200 may be a USB input device. At this time, the first processor 161 may display the wp1 image and the second image in a Picture in Picture (PIP) manner.

In addition, the first processor 161 may receive an input signal from the input device 200 through the input/output interface 130 in operation S920.

When a cursor corresponding to the input signal is located on the second image, the first processor 161 may transmit an input signal to the second processor 162 in operation S930. The second processor 162, when connected with an external device, may be a logic integrated circuit recognized as a USB device.

In the meantime, the input device may include at least one of a mouse or a keyboard. When the cursor of the mouse is located in the first image and the input signal of the mouse is received, the first processor 161 may process the input signal of the mouse. When the cursor of the mouse is located on the second image and the input signal of the mouse is received, the first processor 161 may transmit the input signal of the mouse to the second processor 162.

In addition, when the cursor of the mouse is located on the first image, and the input signal of the keyboard is received, the first processor 161 may process an input signal of a keyboard.

When a cursor of the mouse is located on the second image and an input signal of the keyboard is received, the first processor 161 may transmit an input signal of the keyboard to the second processor 162.

In the meantime, the first processor 161 may obtain an input signal from the external device 300, but this is merely an embodiment, and the first processor 161 may obtain a user touch input signal.

At this time, when a user touch input signal is obtained and the user touch input is an input to touch one area of the first image, the first processor 161 may process a user touch input signal.

In addition, when a user touch input signal is obtained, and the user touch input is an input to touch one area of the second image, the first processor 161 may transmit a user touch input signal to the second processor 162.

In the meantime, the first processor 161 may generate a first image related to a function of the display apparatus, generate a second image based on the image data received from the external device, and control the display 150 to display the first image and the second image together.

When the cursor corresponding to the input signal is located on the third image, the first processor 161 may transmit an input signal to the second processor 162 such that the input signal is transmitted to the second external device.

When a cursor corresponding to the input signal is located on the fourth image, the first processor 161 may transmit an input signal to the second processor 162 such that the input signal is transmitted to the third external device.

When the input signal is received, the second processor 162 may transmit the input signal to the external device 300 in operation S940. Specifically, when an input signal is received, an input signal may be converted into USB data, and an input signal converted into USB data may be transmitted to the external device 300.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

Embodiments may be implemented as software that includes instructions stored in machine-readable storage media readable by a machine (e.g., a computer). A device may call instructions from a storage medium and that is operable in accordance with the called instructions, including a display apparatus 100 according to an embodiment. When the instruction is executed by a processor, the processor may perform the function corresponding to the instruction, either directly or under the control of the processor, using other components. The instructions may include a code generated or executed by the compiler or interpreter. The machine-readable storage medium may be provided in the form of a non-transitory storage medium. The term "non-transitory" means that the storage medium does not include a signal and is tangible, but does not limit the data to necessarily being permanently and/or temporarily stored in a storage medium.

According to one or more embodiments, a method disclosed herein may be provided in a computer program product. A computer program product may be traded between a seller and a purchaser as a commodity. A computer program product may be distributed in the form of a machine-readable storage medium (e.g., CD-ROM) or distributed online through an application store (e.g., PLAYSTORE™). In the case of online distribution, at least a portion of the computer program product may be stored temporarily or at least temporarily in a storage medium such as a manufacturer's server, a server in an application store, or a memory in a relay server.

Each of the components (for example, a module or a program) according to one or more embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with embodiments, may be performed sequentially, in a parallel, repetitive, or heuristic manner, or at least some operations may be performed in a different order, omitted, or other operations can be added.

What is claimed is:

1. A display apparatus comprising:
    an input/output interface connected to an external device and an input device;
    a display;
    a memory configured to store at least one instruction;
    a first processor connected to the memory and configured to control the display apparatus; and
    a second processor configured to be recognized as a universal serial bus (USB) device by the external device,
    wherein the first processor is configured to, by executing the at least one instruction:
        generate a first image related to a function of the display apparatus;
        generate a second image based on image data obtained through the input/output interface from the external device;
        control the display to display the first image and the second image together;
        obtain through the input/output interface an input signal from the input device; and
        based on a cursor corresponding to the input signal being located on the second image, provide the input signal to the second processor,
    wherein the second processor is configured to, based on obtaining the input signal, provide the input signal to the external device, and
    wherein the first processor is configured to, by executing the at least one instruction:
        generate a third image based on second image data obtained from a second external device,
        control the display to display the first image, the second image, and the third image together, and
        based on the cursor corresponding to the input signal being located on the third image, provide the input signal to the second processor and provide the input signal to the second external device.

2. The display apparatus of claim 1, wherein the first processor is further configured to, based on the cursor corresponding to the input signal being located on the first image, process the input signal.

3. The display apparatus of claim 1, wherein the external device is a USB host device, and the input device is a USB input device.

4. The display apparatus of claim 1, wherein the second processor is further configured to, based on connecting with the external device, be a logic integrated circuit recognized as the USB device.

5. The display apparatus of claim 1, wherein the second processor is further configured to, based on obtaining the input signal, convert the input signal to USB data, and provide the input signal converted to the USB data to the external device.

6. The display apparatus of claim 1, wherein the input device comprises a mouse, and
    wherein the first processor is further configured to:
        based on the cursor being located on the first image and an input signal of the mouse being obtained, process the input signal of the mouse, and
        based on the cursor being located on the second image and the input signal of the mouse being obtained, provide the input signal of the mouse to the second processor.

7. The display apparatus of claim 1, wherein the input device further comprises a keyboard, and
    wherein the first processor is further configured to:
        based on the cursor being located on the first image and the input signal of the keyboard being obtained, process the input signal of the keyboard, and
        based on the cursor being located on the second image and the input signal of the keyboard being obtained, provide the input signal of the keyboard to the second processor.

8. The display apparatus of claim 1, wherein the first processor is further configured to:
    obtain a user touch input signal,
    based on the user touch input signal being an input of touching an area of the first image, process the user touch input signal, and
    based on the user touch input signal being an input of touching an area of the second image, provide the user touch input signal to the second processor.

9. The display apparatus of claim 1, wherein the first processor is further configured to control the display to display the first image and the second image in a picture in picture (PIP) manner.

10. The display apparatus of claim 1, wherein the input device is a mouse or a keyboard.

11. The display apparatus of claim 1, wherein the first processor is further configured to:
    generate a fourth image based on third image data obtained from a third external device, and
    control the display to display the first image, the second image, the third image, and the fourth image together, and
    based on the cursor corresponding to the input signal being located on the fourth image, provide the input signal to the second processor and provide the input signal to the third external device.

12. A method of controlling a display apparatus, the method comprising:
    by a first processor, generating a first image related to a function of the display apparatus, generating a second image based on image data obtained from an external device, and displaying the first image and the second image together;
    obtaining, by the first processor, an input signal from an input device;
    based on a cursor corresponding to the input signal being located on the second image, providing, by the first processor, the input signal to a second processor; and
    based on obtaining the input signal, providing, by the second processor, the input signal to the external device,
    wherein the method further comprises:
        generating a third image based on second image data obtained from a second external device, and
        controlling the display to display the first image, the second image, and the third image together, and
        based on the cursor corresponding to the input signal being located on the third image, providing the input signal to the second processor and provide the input signal to the second external device.

13. The method of claim 12, further comprising:
based on the cursor corresponding to the input signal being located on the first image, processing the input signal.

14. The method of claim 12, wherein the external device is a universal serial bus (USB) host device, and the input device is a USB input device.

15. The method of claim 12, wherein the second processor, based on connecting with the external device, is a logic integrated circuit recognized as a universal serial bus (USB) device.

16. An electronic apparatus comprising:
a memory configured to store at least one instruction; and
at least one processor comprising a first processor and a second processor,
wherein the first processor is configured to, by executing the at least one instruction:
generate a first image related to a function of the electronic apparatus;
generate a second image based on image data obtained from an external device;
control a display to display the first image and the second image together;
obtain an input signal from an input device; and
based on a cursor corresponding to the input signal being located on the second image, provide the input signal to the second processor,
wherein the second processor is configured to:
be recognized as a universal serial bus (USB) device by the external device; and
based on obtaining the input signal, provide the input signal to the external device, and
wherein the first processor is configured to, by executing the at least one instruction:
generate a third image based on second image data obtained from a second external device,
control the display to display the first image, the second image, and the third image together, and
based on the cursor corresponding to the input signal being located on the third image, provide the input signal to the second processor and provide the input signal to the second external device.

17. The electronic apparatus of claim 16, wherein the first processor is further configured to, based on the cursor corresponding to the input signal being located on the first image, process the input signal.

18. The electronic apparatus of claim 16, wherein the external device is a USB host device, and the input device is a USB input device.

19. The electronic apparatus of claim 16, wherein the second processor is further configured to, based on connecting with the external device, be a logic integrated circuit recognized as the USB device.

20. The electronic apparatus of claim 16, wherein the second processor is further configured to, based on obtaining the input signal, convert the input signal to USB data, and provide the input signal converted to the USB data to the external device.

* * * * *